(12) United States Patent
Satake

(10) Patent No.: US 10,890,883 B2
(45) Date of Patent: Jan. 12, 2021

(54) BATTERY MONITORING

(71) Applicant: KYOCERA CORPORATION, Kyoto (JP)

(72) Inventor: Masaomi Satake, Yokohama (JP)

(73) Assignee: KYOCERA CORPORATION, Kyoto (JP)

( * ) Notice: Subject to any disclaimer, the term of this patent is extended or adjusted under 35 U.S.C. 154(b) by 673 days.

(21) Appl. No.: 14/419,908

(22) PCT Filed: Aug. 6, 2013

(86) PCT No.: PCT/JP2013/071225
§ 371 (c)(1),
(2) Date: Feb. 5, 2015

(87) PCT Pub. No.: WO2014/024870
PCT Pub. Date: Feb. 13, 2014

(65) Prior Publication Data
US 2015/0293510 A1 Oct. 15, 2015

(30) Foreign Application Priority Data
Aug. 6, 2012 (JP) .................................. 2012-174458

(51) Int. Cl.
*G05B 15/02* (2006.01)
*H02J 3/38* (2006.01)
(Continued)

(52) U.S. Cl.
CPC .......... *G05B 15/02* (2013.01); *H01M 10/425* (2013.01); *H01M 10/48* (2013.01); *H02J 3/383* (2013.01);
(Continued)

(58) Field of Classification Search
CPC .. G05B 15/02; H04L 12/2818; H02J 13/0079; H02J 3/383; H02J 3/387;
(Continued)

(56) References Cited

U.S. PATENT DOCUMENTS 3,040,182 A * 6/1962 Lapuyade ............... H02J 9/061
307/126
5,272,475 A * 12/1993 Eaton ....................... G08B 6/00
320/155
(Continued)

FOREIGN PATENT DOCUMENTS

DE 195 03 917 A1 8/1996
DE 10 2011 054 374 A1 4/2012
(Continued)

OTHER PUBLICATIONS

Pedram et al., "Hybrid Electrical Energy Storage Systems", 2010, ISLPED'10, Aug. 18-20, 2010, Austin, Texas, USA. (Year: 2010).*
(Continued)

*Primary Examiner* — Mohammad Ali
*Assistant Examiner* — Kelvin Booker
(74) *Attorney, Agent, or Firm* — Procopio Cory Hargreaves and Savitch LLP

(57) ABSTRACT

An EMS (200) receives at least one of a message indicating a rated output of the storage battery (141) and a message indicating number of charged and discharged times of the storage battery (141), from the power storage apparatus (140).

6 Claims, 7 Drawing Sheets

(51) Int. Cl.
<table>
<tr><td>H02J 13/00</td><td>(2006.01)</td></tr>
<tr><td>H02J 7/35</td><td>(2006.01)</td></tr>
<tr><td>H01M 10/48</td><td>(2006.01)</td></tr>
<tr><td>H01M 16/00</td><td>(2006.01)</td></tr>
<tr><td>H01M 10/42</td><td>(2006.01)</td></tr>
<tr><td>H04L 12/28</td><td>(2006.01)</td></tr>
</table>

(52) U.S. Cl.
CPC .............. *H02J 3/387* (2013.01); *H02J 7/35* (2013.01); *H02J 13/00018* (2020.01); *H02J 13/0079* (2013.01); *H04L 12/2818* (2013.01); *H01M 16/003* (2013.01); *H01M 2010/4278* (2013.01); *Y02B 10/10* (2013.01); *Y02B 90/20* (2013.01); *Y02E 10/56* (2013.01); *Y02E 40/70* (2013.01); *Y02P 80/10* (2015.11); *Y02P 90/40* (2015.11); *Y02P 90/50* (2015.11); *Y04S 10/12* (2013.01); *Y04S 10/123* (2013.01); *Y04S 20/12* (2013.01)

(58) Field of Classification Search
CPC ...... H02J 7/35; H02J 13/0072; H01M 10/425; H01M 10/48; H01M 2010/4278; Y04S 10/123; Y04S 10/12; Y02E 40/72; Y02E 10/563; Y02E 10/566
See application file for complete search history.

(56) References Cited

U.S. PATENT DOCUMENTS

| | | | |
|---|---|---|---|
| 5,652,498 A | 7/1997 | Edye et al. | |
| 8,350,529 B2* | 1/2013 | Loncarevic | H02J 7/0016 320/122 |
| 9,379,571 B2* | 6/2016 | Boyer | B60L 11/182 |
| 9,639,904 B2* | 5/2017 | Idrees | G06Q 50/06 |
| 9,680,334 B2* | 6/2017 | Toya | H02J 7/02 |
| 9,847,648 B2* | 12/2017 | Shelton | H02J 3/383 |
| 10,396,570 B2* | 8/2019 | Loncarevic | H02J 7/0016 |
| 2004/0044442 A1* | 3/2004 | Bayoumi | H02J 3/00 700/286 |
| 2006/0158037 A1* | 7/2006 | Danley | H02J 3/383 307/64 |
| 2006/0203772 A1* | 9/2006 | Laroia | H04W 28/22 370/329 |
| 2006/0203856 A1* | 9/2006 | Laroia | H04L 1/0025 370/522 |
| 2008/0212343 A1* | 9/2008 | Lasseter | H02J 3/30 363/39 |
| 2008/0224541 A1* | 9/2008 | Fukuhara | H02J 3/32 307/48 |
| 2008/0231114 A1* | 9/2008 | Tolnar | H02J 3/14 307/38 |
| 2009/0058364 A1* | 3/2009 | Asada | H02J 7/1438 320/134 |
| 2009/0139781 A1* | 6/2009 | Straubel | B60L 11/1875 180/65.1 |
| 2009/0176417 A1* | 7/2009 | Rembach | B63H 21/20 440/6 |
| 2010/0198420 A1* | 8/2010 | Rettger | G01W 1/10 700/291 |
| 2010/0231045 A1* | 9/2010 | Collins | H02J 3/28 307/47 |
| 2011/0001356 A1* | 1/2011 | Pollack | B60L 11/1842 307/31 |
| 2011/0074357 A1* | 3/2011 | Parakulam | H01M 8/0432 320/134 |
| 2011/0106328 A1* | 5/2011 | Zhou | G05B 13/024 700/291 |
| 2011/0109158 A1* | 5/2011 | Olsen | B60L 3/0069 307/10.1 |
| 2011/0115425 A1* | 5/2011 | Olsson | B60L 3/04 320/101 |
| 2011/0125337 A1* | 5/2011 | Zavadsky | G06F 1/263 700/291 |
| 2011/0172740 A1* | 7/2011 | Matos | A61N 1/37264 607/60 |
| 2011/0196547 A1* | 8/2011 | Park | H02J 3/14 700/296 |
| 2011/0202217 A1* | 8/2011 | Kempton | B60L 53/665 701/22 |
| 2011/0204720 A1* | 8/2011 | Ruiz | B60L 11/1816 307/66 |
| 2011/0221276 A1* | 9/2011 | Geinzer | H02J 3/32 307/66 |
| 2011/0245987 A1* | 10/2011 | Pratt | H01M 10/44 700/295 |
| 2011/0273129 A1* | 11/2011 | Coe | H02J 7/007 320/101 |
| 2012/0053742 A1 | 3/2012 | Tsuda | |
| 2012/0059528 A1* | 3/2012 | Umesawa | G01D 4/002 700/295 |
| 2012/0065805 A1* | 3/2012 | Montalvo | G06Q 10/06 700/297 |
| 2012/0101755 A1 | 4/2012 | Hirasawa | |
| 2012/0161523 A1* | 6/2012 | Kim | H02J 13/0075 307/66 |
| 2012/0228939 A1* | 9/2012 | Kaga | H02J 7/35 307/43 |
| 2012/0242148 A1* | 9/2012 | Galati | H02J 3/14 307/39 |
| 2012/0249065 A1* | 10/2012 | Bissonette | B60L 11/184 320/109 |
| 2012/0267952 A1* | 10/2012 | Ballatine | H02J 1/102 307/26 |
| 2012/0303397 A1* | 11/2012 | Prosser | H02J 7/0054 705/7.12 |
| 2013/0009607 A1* | 1/2013 | Nishibayashi | B60L 11/1844 320/162 |
| 2013/0052538 A1* | 2/2013 | Pasta | H01M 4/362 429/245 |
| 2013/0082640 A1* | 4/2013 | Nishibayashi | H02J 3/32 320/106 |
| 2013/0082641 A1* | 4/2013 | Nishibayashi | H02J 3/32 320/106 |
| 2013/0099720 A1* | 4/2013 | Chuah | H02J 7/041 320/101 |
| 2013/0231793 A1* | 9/2013 | Elliott | G05B 15/02 700/292 |
| 2013/0245841 A1* | 9/2013 | Ahn | H02J 13/0079 700/286 |
| 2013/0325197 A1* | 12/2013 | Mansfield | H02J 3/32 700/291 |
| 2014/0005852 A1* | 1/2014 | Asghari | G06F 1/26 700/295 |
| 2014/0013722 A1* | 1/2014 | Pitcel | A01D 69/025 56/10.6 |
| 2014/0018969 A1* | 1/2014 | Forbes, Jr. | H02J 13/00034 700/295 |
| 2014/0042978 A1* | 2/2014 | Nishibayashi | H02J 3/322 320/134 |
| 2014/0077595 A1* | 3/2014 | Kakuya | H01M 10/441 307/24 |
| 2014/0084686 A1* | 3/2014 | Nishibayashi | H02J 3/32 307/26 |
| 2014/0132073 A1* | 5/2014 | Satake | H02J 1/102 307/64 |
| 2014/0217826 A1* | 8/2014 | Oguchi | H02J 7/35 307/46 |
| 2014/0354240 A1* | 12/2014 | Wang | B60L 53/11 320/136 |
| 2014/0379160 A1* | 12/2014 | Fallon | G06Q 50/06 700/297 |
| 2015/0015075 A1* | 1/2015 | Toya | H02J 9/06 307/66 |
| 2015/0188316 A1* | 7/2015 | Shiga | G06Q 50/06 700/295 |
| 2015/0229130 A1* | 8/2015 | Yamane | H02J 9/06 700/297 |

(56) References Cited

U.S. PATENT DOCUMENTS

| | | | | |
|---|---|---|---|---|
| 2015/0276253 A1* | 10/2015 | Montalvo | ............... | G06Q 10/06 700/276 |
| 2017/0189701 A1* | 7/2017 | Matos | ................ | A61N 1/37282 |
| 2017/0271984 A1* | 9/2017 | Kohn | .................... | H02M 3/156 |
| 2017/0310112 A1* | 10/2017 | Goasguen | ................. | H02J 7/35 |
| 2018/0356770 A1* | 12/2018 | Elbsat | .................. | G05B 13/021 |
| 2018/0367320 A1* | 12/2018 | Montalvo | ............... | H04L 12/12 |
| 2019/0379214 A1* | 12/2019 | Loncarevic | ........... | H02J 7/0016 |

FOREIGN PATENT DOCUMENTS

| | | |
|---|---|---|
| JP | H10-073440 A | 3/1998 |
| JP | 2006-048105 A | 2/2006 |
| JP | 2006-290209 A | 10/2006 |
| JP | 2008-253002 A | 10/2008 |
| JP | 2010-128810 A | 6/2010 |
| JP | 2010-250664 A | 12/2011 |
| JP | 2011-250664 A | 12/2011 |
| JP | 2012-075306 A | 4/2012 |

OTHER PUBLICATIONS

Nourai, A., "Installation of the First Distributed Energy Storage System (DESS) at American Electric Power (AEP) A Study for the DOE Energy Storage Systems Program", Jun. 2007. (Year: 2007).*

Wang et al., "Charge Migration Efficiency Optimization in Hybrid Electrical Energy Storage (HEES) Systems", 2011, IEEE. (Year: 2011).*

Office Action dated Aug. 25, 2015, issued in counterpart Japanese application No. 2012-174458.

New communication standard ECHONET Lite that is the core of the smart house construction becomes the standard interface of the HEMS (the first part).

Office Action dated Dec. 15, 2015 issued by the Japanese Patent Office for corresponding application No. 2012-174458.

Office Action dated May 17, 2016, issued in counterpart Japanese Application No. 2015-210269.

Office Action dated Dec. 20, 2016 issued by the Japanese Patent Office in Counterpart Japanese Application No. 2016-219370.

International Search Report; PCT/JP2013/071225; dated Sep. 3, 2013.

Extended European Search Report dated Jul. 11, 2016 issued by the European Patent Office for Counterpart European Application No. 13 82 8427.

Smartgrid Newsletter Editorial Dept, New communication standard ECHONET Lite that is the core of the smart house construction becomes the standard interface of the HEMS, Second part, Feb. 2012, Impress Smart Grid Forum, https://sgforum.impress.co.jp/article/1304, Japan, 17 pages.

ECHONET Consortium, ECHONET Lite Communication Middleware Specification, Part II, Version 1.01, Mar. 2012, 51 pages.

* cited by examiner

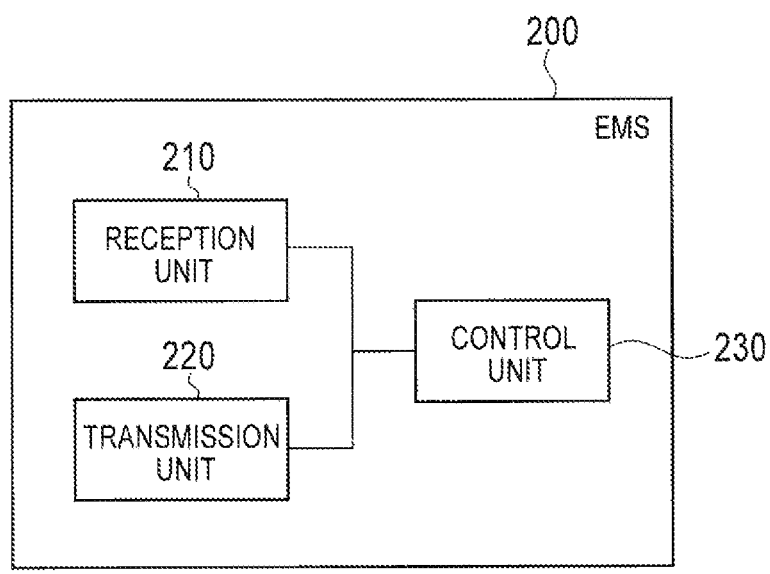

FIG. 7

| MESSAGE TYPE (BBB) | RATED OUTPUT (0000 TO X000) |
|---|---|

FIG. 8

| MESSAGE TYPE (CCC) | NUMBER OF CHARGED AND DISCHARGED TIMES (0000 TO X000) |
|---|---|

BATTERY MONITORING

TECHNICAL FIELD

The present invention relates to a management method comprising a power storage apparatus which charges and discharges power using a storage battery, and a control apparatus which communicates with the power storage apparatus, as well as a control apparatus and a power storage apparatus.

BACKGROUND ART

In recent years, a power management system having a plurality of equipments, and a control apparatus which controls the plurality of equipments has been proposed (for example, Patent Literature 1). The plurality of equipments comprises, for example, household electrical appliances such as air conditioners and illumination apparatuses, and distributed power sources such as photovoltaic cells, storage batteries, and fuel power generation apparatus. The control apparatus, for example, is referred to as HEMS (Home Energy Management System), SEMS (Store Energy Management System), BEMS (Building Energy Management System), FEMS (Factory Energy Management System), and CEMS (Cluster/Community Energy Management System).

For popularizing the above-described management system, generalization of the message format between the plurality of equipments and the control apparatus is effective, and such a generalization of the message format is being tested.

CITATION LIST

Patent Literature

Patent Literature 1: Japanese Patent Application Publication No. 2010-128810.

SUMMARY OF INVENTION

The above-described generalization of the message format has only just begun, and various investigations need to be conducted with regard to the message format for appropriately controlling the equipments.

Thus, the present invention has been achieved in order to overcome the above-described problems, and an object thereof is to provide a management method, a control apparatus, and a power storage apparatus capable of appropriately controlling equipments.

A management method according to a first feature is used in a management system comprising a power storage apparatus which comprises a storage battery which accumulates power, and a control apparatus which communicates with the power storage apparatus. The management method comprises a step of transmitting at least one of a message indicating a rated output of the storage battery and a message indicating number of charged and discharged times of the storage battery, from the power storage apparatus to the control apparatus.

In the first feature, the message indicating the rated output of the storage battery is a message indicating the rated output in a self-sustained operation state in which the power storage apparatus is disconnected from a grid.

In the first feature, the management method further comprises a step of transmitting a message indicating an existence or non-existence of a function of transmitting the rated output of the storage battery from the power storage apparatus to the control apparatus, before a communication of the message indicating the rated output of the storage battery.

In the first feature, the message indicating the existence or non-existence of the function is transmitted from the control apparatus to the power storage apparatus at a timing of performing an initial settings of the power storage apparatus, a timing of restoration from a power failure, a timing of turning ON a power supply of the power storage apparatus, a timing of turning ON a power supply of the control apparatus, and a timing when it becomes necessary to check settings of the power storage apparatus.

In the first feature, the management method further comprises a step of transmitting a message indicating an existence or non-existence of a function of transmitting number of charged and discharged times of the storage battery from the control apparatus to the power storage apparatus, before a communication of the message indicating number of charged and discharged times of the storage battery.

A control apparatus according to a second feature communicates with a power storage apparatus which comprises a storage battery which accumulates power. The control apparatus receives at least one of a message indicating a rated output of the storage battery and a message indicating number of charged and discharged times of the storage battery, from the power storage apparatus.

A power storage apparatus according to a third feature comprises a storage battery which accumulates power. The power storage apparatus comprises a communication unit which transmits at least one of a message indicating a rated output of the storage battery and a message indicating number of charged and discharged times of the storage battery, to the control apparatus which communicates with the power storage apparatus.

According to the present invention, it is possible to provide a management method, a control apparatus, and a power storage apparatus capable of appropriately controlling equipments.

BRIEF DESCRIPTION OF DRAWINGS

FIG. 5 is a diagram showing an EMS 200 according to the first embodiment.

FIG. 6 is a diagram showing a message format according to the first embodiment.

FIG. 7 is a diagram showing a message format according to the first embodiment.

FIG. 8 is a diagram showing a message format according to the first embodiment.

DESCRIPTION OF EMBODIMENTS

Figure 1:
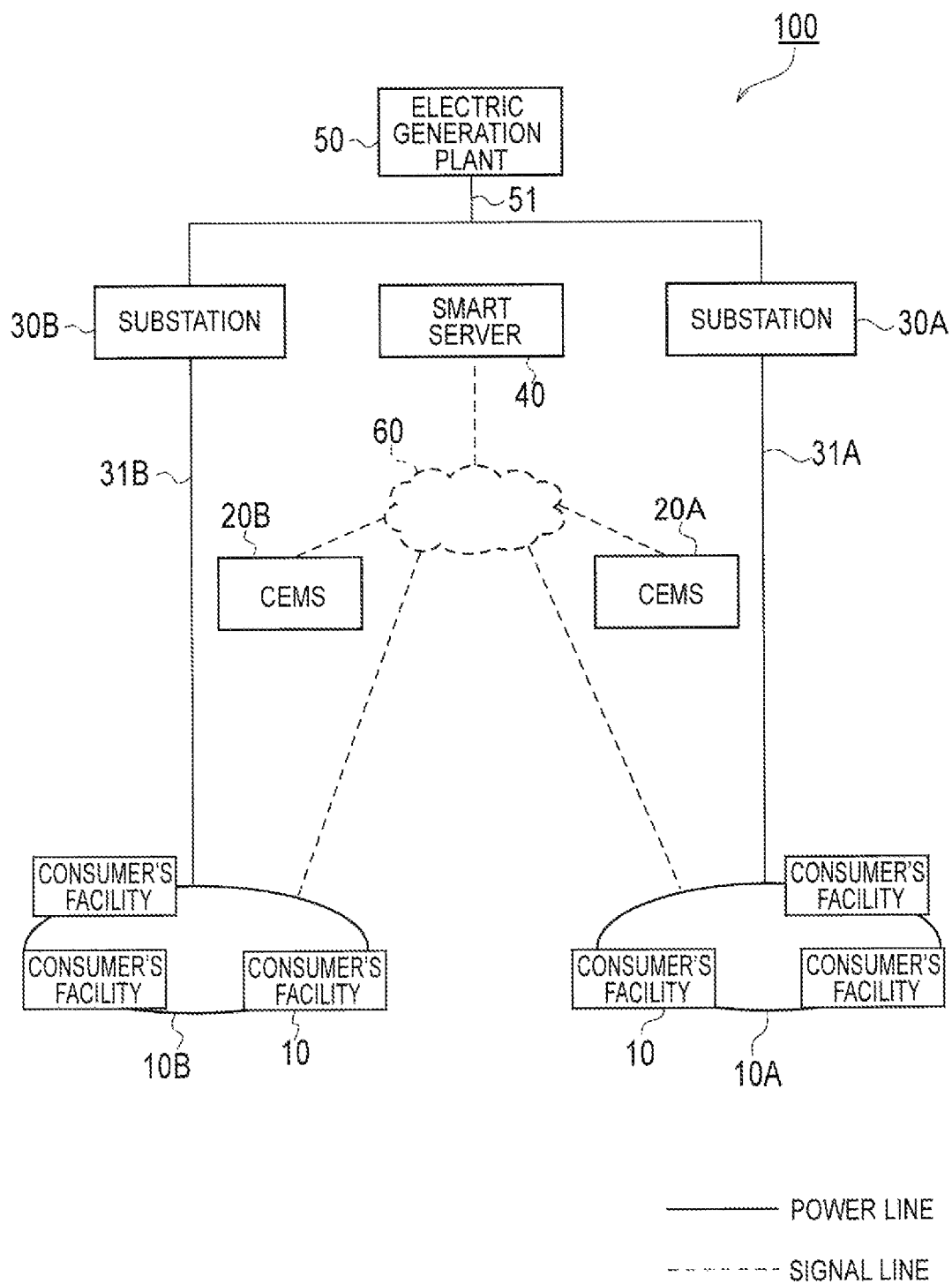
FIG. 1 is a diagram showing an energy management system 100 according to a first embodiment.

Hereinafter, a management system according to embodiments of the present invention will be described with reference to the drawings. In the following drawings, identical or similar components are denoted by identical or similar reference numerals.

It should be understood that the drawings are schematic only and the ratio of dimensions is not to scale. Therefore, specific dimensions should be determined with reference to the description below. It is needless to mention that different relationships and ratio of dimensions may be included in different drawings.

Outline of the Embodiments

A management method according to embodiments is used in a management system comprising a power storage apparatus which comprises a storage battery which accumulates power, and a control apparatus which communicates with the power storage apparatus. The management method comprises a step of transmitting at least one of a message indicating a rated output of the storage battery and a message indicating number of charged and discharged times of the storage battery, from the power storage apparatus to the control apparatus.

In the embodiments, by transmitting a message indicating a rated output of a storage battery from a power storage apparatus to a control apparatus, the other equipments (such as a load and a fuel cell apparatus) can be controlled appropriately. Alternatively, by transmitting a message indicating number of charged and discharged times of the storage battery from the power storage apparatus to the control apparatus, the extent of degradation of the storage battery can be determined.

First Embodiment (Energy Management System)

The energy management system according to the first embodiment will be described, below. FIG. 1 is a diagram showing an energy management system 100 according to the first embodiment.

As shown in FIG. 1, the energy management system 100 comprises a consumer's facility, a CEMS 20, a substation 30, a smart server 40, and an electric generation plant 50. It is noted that the consumer's facility, the CEMS 20, the substation 30, and the smart server 40 are connected by a network 60.

The consumer's facility 10 has a power generation apparatus and a power storage apparatus, for example. The power generation apparatus is an apparatus which uses fuel gas to output power such as a fuel cell, for example. The power storage apparatus such as a secondary battery is an apparatus in which power is stored.

The consumer's facility 10 may be a detached residence, a housing complex such as an apartment house. Or, the consumer's facility may be a shop such as a corner store or a supermarket. It is noted that the consumer's facility may be a business facility such as an office building or a factory.

In the first embodiment, a consumer's facility group 10A and a consumer's facility group 10B are configured by a plurality of the consumer's facilities 10. The consumer's facility group 10A and consumer's facility group 10B are classified into each geographical region, for example.

The CEMS 20 controls an interconnection between the plurality of consumer's facilities 10 and the power grid. It is noted that the CEMS 20 may be also called a CEMS (Cluster/Community Energy Management System), since the CEMS 20 manages the plurality of consumer's facilities 10. Specifically, the CEMS 20 disconnects the plurality of consumer's facilities 10 and the power grid at a power failure or the like. On the other hand, the CEMS 20 interconnects the plurality of consumer's facilities 10 to the power grid, for example, at restoration of power.

In the first embodiment, a CEMS 20A and a CEMS 20B are provided. The CEMS 20A controls an interconnection between the consumer's facilities 10 included in the consumer's facility group 10A and the power grid, for example. The CEMS 20B controls an interconnection between the consumer's facilities 10 included in the consumer's facility group 10B and the power grid, for example.

The substation 30 supplies power to the plurality of consumer's facilities 10 through a distribution line 31. Specifically, the substation 30 lowers the voltage supplied from the electric generation plant 50.

In the first embodiment, a substation 30A and a substation 30B are provided. The substation 30A supplies power to the consumer's facilities 10 included in the consumer's facility group 10A through a distribution line 31A, for example. The substation 30B supplies power to the consumer's facilities 10 included in the consumer's facility group 10B through a distribution line 31B, for example.

The smart server 40 manages a plurality of the CEMSs 20 (here, the CEMS 20A and CEMS 20B). Further, the smart server 40 manages a plurality of the substations 30 (here, the substation 30A and the substation 30B). In other words, the smart server 40 integrally manages the consumer's facilities 10 included in the consumer's facility groups 10A and 10B. For example, the smart server 40 has a function of balancing the power to be supplied to the consumer's facility group 10A and the power to be supplied to the consumer's facility group 10B.

The electric generation plant 50 generates power by thermal power, solar power, wind power, water power, atomic power or the like. The electric generation plant 50 supplies power to the plurality of the substations 30 (here, the substation 30A and the substation 30B) through an electric feeder line 51.

The network 60 is connected to each apparatus via a signal line. The network 60 is an Internet, a wide area network, a narrow area network, and a mobile phone network, for example.

(Consumer's Facility)

Figure 2:
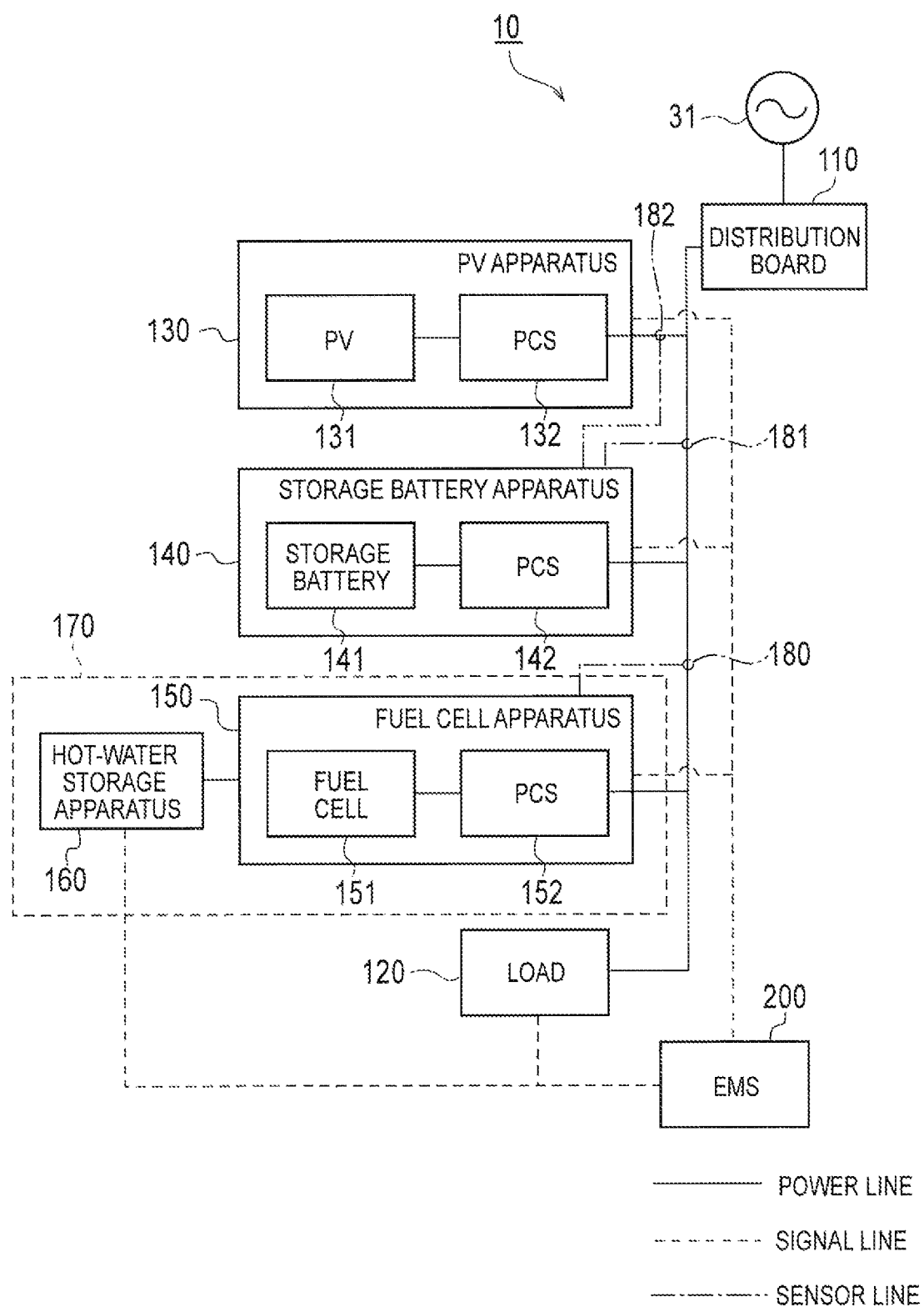
FIG. 2 is a diagram showing a consumer's facility 10 according to the first embodiment.

The consumer's facility according to the first embodiment will be described, below. FIG. 2 is a diagram showing the details of the consumer's facility according to the first embodiment.

As shown in FIG. 2, the consumer's facility comprises a distribution board 110, a load 120, a PV apparatus 130, a storage battery apparatus 140, a fuel cell apparatus 150, a hot-water storage apparatus 160, and an EMS 200.

In the first embodiment, a consumer's facility 10 comprises an ammeter 180, an ammeter 181, and an ammeter 182.

The ammeter 180 is used for the load following control on the fuel cell apparatus 150. The ammeter 180 is arranged downstream of a connection point between a storage battery apparatus 140 and a power line (the side away from the grid) and upstream of a connection point between the fuel cell apparatus 150 and the power line (the side closer to the grid), on the power line connecting each apparatus (for example, the storage battery apparatus 140 and the fuel cell apparatus 150) and the grid. It is natural that the ammeter 180 is arranged upstream (the side closer to the grid) of the connection point between the load 120 and the power line.

The ammeter 181 is used for checking the existence or non-existence of the flow of power from the storage battery apparatus 140 to the grid (reverse power flow). The ammeter 181 is arranged upstream of a connection point between the storage battery apparatus 140 and a power line (the side closer to the grid), on the power line connecting each equipment (for example, the storage battery apparatus 140) and the grid.

The ammeter 182 is used for measuring the power generated by the PV apparatus 130. The ammeter 182 is arranged on the side of the PV apparatus 130 from a connection point between a power line connecting each equipment (for example, the PV apparatus 130) and the grid, and the PV apparatus 130.

It must be noted that in the first embodiment, each equipment is connected to the power line in the short-distance order to the grid of the PV apparatus 130, the storage battery apparatus 140, the fuel cell apparatus 150, and the load 120. However, the fuel cell apparatus 150 and the storage battery apparatus 140 may be connected in the reverse order as well.

The distribution board 110 is connected to a distribution line 31 (a grid). The distribution board 110 is connected, via a power line, to the load 120, the PV apparatus 130, the storage battery apparatus 140, and the fuel cell apparatus 150.

The load 120 is an apparatus which consumes the power supplied via a power line. Examples of the load 120 comprise an apparatus such as a refrigerator, a freezer, a lighting, and an air conditioner.

The PV apparatus 130 comprises a PV 131 and a PCS 132. The PV 131 is an example of the power generation apparatus, and is a solar light power generation apparatus (Photovoltaic Device) which generates power in response to reception of solar light. The PV 131 outputs the generated DC power. The amount of power generated by the PV 131 varies depending on the amount of solar radiation entering the PV 131. The PCS 132 is an apparatus (Power Conditioning System) which converts the DC power output from the PV 131, into AC power. The PCS 132 outputs the AC power to the distribution board 110 via a power line.

In the first embodiment, the PV apparatus 130 may comprise a pyranometer which measures the solar radiation entering the PV 131.

The PV apparatus 130 is controlled by an MPPT (Maximum Power Point Tracking) method. In particular, the PV apparatus 130 optimizes an operation point (point determined by an operation-point voltage value and power value, or a point determined by an operation-point voltage value and current value) of the PV 131.

The storage battery apparatus 140 is a power storage apparatus which comprises a storage battery 141 and a PCS 142. The storage battery 141 is an apparatus which stores power. The PCS 142 is an apparatus (Power Conditioning System) which converts the AC power supplied from the distribution line 31 (grid), into DC power. Further, the PCS 142 converts the DC power output from the storage battery 141, into AC power.

The fuel cell apparatus 150 comprises a fuel cell 151 and a PCS 152. The fuel cell 151 is an example of a power generation apparatus, and an apparatus which generates power by using a fuel (gas). The PCS 152 is an apparatus (Power Conditioning System) which converts the DC power output from the fuel cell 151, into AC power.

The fuel cell apparatus 150 is operated by load following control. In particular, the fuel cell apparatus 150 controls the fuel cell 151 so that the power output from the fuel cell 151 reaches a target power of the load following control. In other words, the fuel cell apparatus 150 controls the power outputted from the fuel cell 151 such that a product of an electric current value detected by the ammeter 180 and a voltage value detected by the PCS 152 becomes a target received power.

The hot-water storage apparatus 160 is an apparatus which either generates hot water using fuel (gas), or maintains the water temperature. Specifically, the hot-water storage apparatus 160 comprises a hot-water storage tank where the water supplied from the hot-water storage tank is warmed by the heat generated by burning of fuel (gas) or the exhaust heat generated by drive (power generation) of the fuel cell 151. In particular, the hot-water storage apparatus 160 warms the water supplied from the hot-water storage tank and feeds the warmed water back to the hot-water storage tank.

It must be noted that in the embodiment, the fuel cell apparatus 150 and the hot-water storage apparatus 160 configure the hot-water supply unit 170 (the hot-water supply system).

The EMS 200 is an apparatus (Energy Management System) which controls the PV apparatus 130, the storage battery apparatus 140, the fuel cell apparatus 150, and the hot-water storage apparatus 160. Specifically, the EMS 200 is connected to the PV apparatus 130, the storage battery apparatus 140, the fuel cell apparatus 150, and the hot-water storage apparatus 160 via a signal line, and controls the PV apparatus 130, the storage battery apparatus 140, the fuel cell apparatus 150, and the hot-water storage apparatus 160. Further, the EMS 200 controls an operation mode of the load 120 to control the power consumption of the load 120.

Further, the EMS 200 is connected, via the network 60, to various types of servers. The various types of servers store information such as a purchase unit price of power supplied from a grid, a sales unit price of the power supplied from the grid, and a purchase unit price of fuel, for example (hereinafter, energy rate information).

Alternatively, various types of servers store information for predicting the power consumption of the load 120 (hereinafter, consumed-energy prediction information), for example. The consumed-energy prediction information may be generated on the basis of an actual value of the power consumption of the load 120 in the past, for example. Alternatively, the consumed-energy prediction information may be a model of the power consumption of the load 120.

Alternatively, various types of servers store information for predicting an amount of power generated by the PV 131 (hereinafter, PV-power-generation-amount prediction information), for example. The PV-power-generation prediction information may be a predicted value of a solar radiation entering the PV 131. Alternatively, the PV-power-generation prediction information may be a weather forecast, a season, and hours of sunlight, for example.

(Operation Mode of the Storage Battery Apparatus)

The storage battery apparatus 140 operates according to any one of a plurality of operation modes each with a different criterion of charging and discharging of the storage battery 141.

The plurality of operation modes comprise an operation mode in a grid connection state and an operation mode in a self-sustained operation state. The grid connection state is the state in which the storage battery apparatus 140 and the grid are connected in parallel. On the other hand, the self-sustained operation state is the state in which the storage battery apparatus 140 and the grid are disconnected. An example of the self-sustained operation state may comprise a state in which a power failure occurs.

The operation modes in the grid connection state comprise (a) an operation mode in which the charging and discharging of the storage battery 141 is controlled so that the sales of power generated by the PV apparatus 130 (reverse power flow) is prioritized (a solar light power sales priority mode), (b) an operation mode in which the charging and discharging of the storage battery 141 is controlled so that the storage battery 141 is charged by the power generated by the PV apparatus 130 (a solar light charging mode), (c) an operation mode in which the charging and discharging of the storage battery 141 is controlled so that the power supplied from the grid does not exceed a fixed value (a peak cut mode), (d) an operation mode in which the charging and discharging of the storage battery 141 is controlled so that the storage battery 141 is charged by the power supplied from the grid, in a period when the unit price of the power supplied from the grid is lower than the threshold value (for example, nighttime) (a midnight power utilization mode), (e) an operation mode in which power is accumulated forcibly in the storage battery 141 (a forced power storage mode), and (f) an operation mode in which the power accumulated in the storage battery 141 is discharged forcibly (a forced discharge mode), for example.

Here, in the (a) solar light power sales priority mode and the (b) solar light charging mode, the storage battery apparatus 140 must monitor the current measured by the ammeter 182, and then control the charging and discharging of the storage battery 141 according to the amount of power generated by the PV apparatus 130. Since the amount of power generated by the PV apparatus 130 changes momentarily, these operation modes are preferably controlled by the storage battery apparatus 140.

Similarly, in the (c) peak cut mode, the storage battery apparatus 140 must monitor the current measured by the ammeter 181 and the ammeter 182, and then control the charging and discharging of the storage battery 141 according to the amount of power supplied from the grid. The amount of power supplied from the grid is a value obtained by subtracting the power calculated based on measured value of the ammeter 182 from the power calculated based on measured value of the ammeter 181. Since the amount of power generated by the PV apparatus 130 and the power consumption of the load 120 changes momentarily, this operation mode is preferably controlled by the storage battery apparatus 140.

In the first embodiment, the (a) solar light power sales priority mode, the (b) solar light charging mode, and the (c) peak cut mode are an example of the operation mode in which a PV 131 other than the storage battery 141 and the storage battery 141 are cooperated.

The operation modes in the self-sustained operation state comprise (g) an operation mode in which the power generated by the PV apparatus 130 is accumulated (hereinafter, the self-sustained power storage mode), (h) an operation mode in which power is supplied to a load 120 connected to a self-sustained outlet provided in the storage battery apparatus 140 (hereinafter, the self-sustained supply mode), and (i) an operation mode in which power is supplied to a load 120 connected to a self-sustained outlet provided in the storage battery apparatus 140 while accumulating the power generated by the PV apparatus 130 (hereinafter, the self-sustained power storage and supply mode), for example.

In addition, as a control common to all operation modes, the storage battery apparatus 140 must monitor the current measured by the ammeter 181, and control the charging and discharging of the storage battery 141 so that power does not flow from the storage battery apparatus 140 to the grid (reverse power flow). Since the power consumption of the load 120 changes momentarily, these operation modes are preferably controlled by the storage battery apparatus 140.

(Fuel Cell Apparatus)

Figure 3:
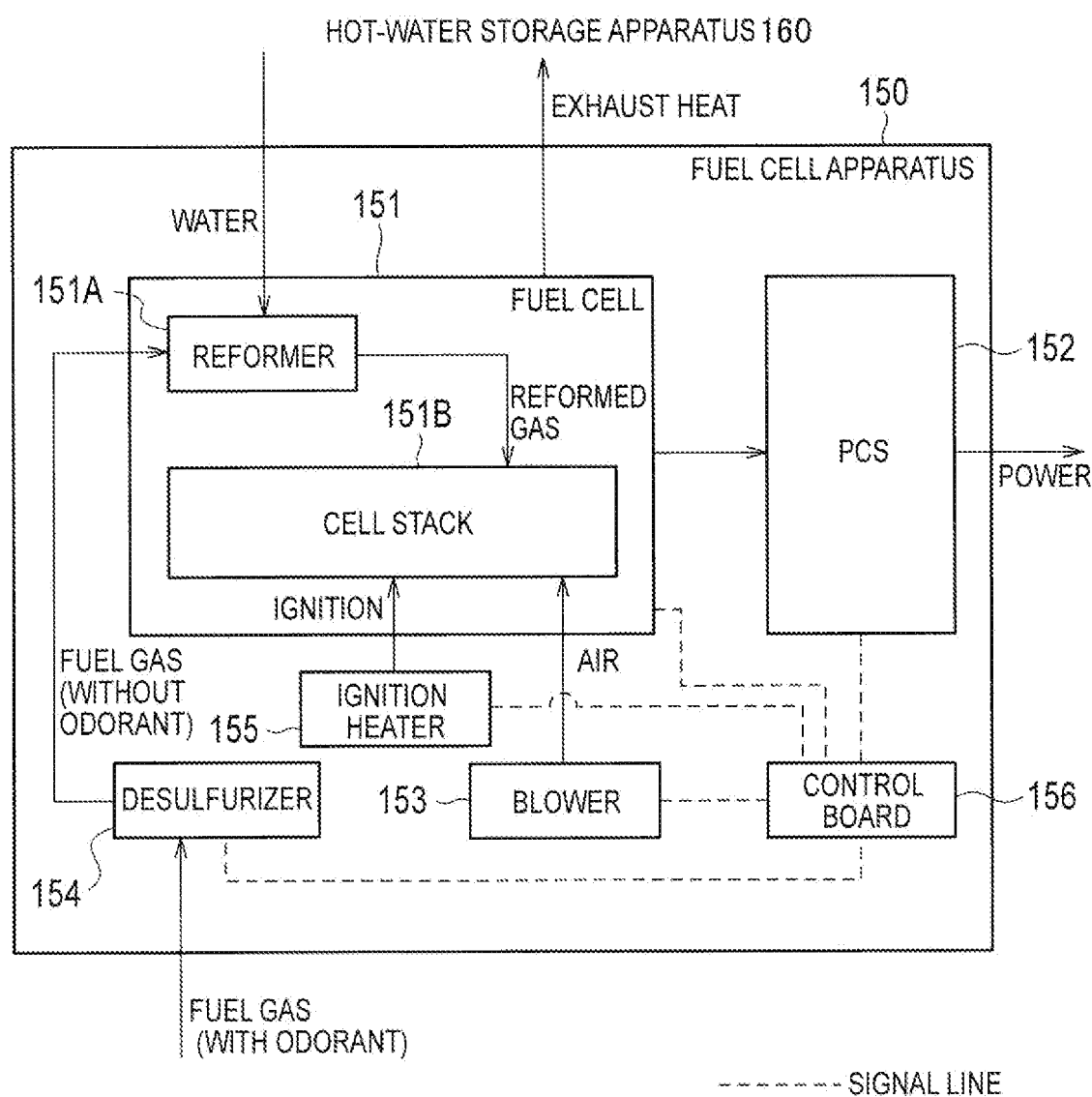
FIG. 3 is a diagram showing a fuel cell apparatus 150 according to the first embodiment.

Hereinafter, the fuel cell apparatus according to the first embodiment will be described. FIG. 3 is a diagram showing a fuel cell apparatus 150 according to the first embodiment.

As shown in FIG. 3, the fuel cell apparatus 150 comprises a fuel cell 151, a PCS 152, a blower 153, a desulfurizer 154, an ignition heater 155, and a control board 157.

The fuel cell 151 is an apparatus which uses fuel gas to output power, as described above. Specifically, the fuel cell 151 comprises a reformer 151A and a cell stack 151B.

The reformer 151A generates reformed gas from the fuel gas obtained by removing an odorant by the desulfurizer 154 described later. The reformed gas is comprised of hydrogen and carbon monoxide.

The cell stack 151B generates power upon chemical reaction between air (oxygen) supplied from the blower 153 described later and the reformed gas. Specifically, the cell stack 151B has a structure obtained by stacking a plurality of cells on top of one another. Each cell has a structure in which an electrolyte is sandwiched between a fuel electrode and an air electrode. The fuel electrode is supplied with reformed gas (hydrogen) and the air electrode is supplied with air (oxygen). In the electrolyte, a chemical reaction between reformed gas (hydrogen) and air (oxygen) occurs, and as a result, power (DC power) and heat are generated.

The PCS 152 is an apparatus which converts the DC power output from the fuel cell 151 into AC power, as described above.

The blower 153 supplies the fuel cell 151 (cell stack 151B) with air. The blower 153 is configured by a fan, for example.

The desulfurizer 154 removes the odorant included in fuel supplied from outside. Fuel may be city gas or LP gas.

The ignition heater 155 ignites fuel not chemically reacted in the cell stack 151B (hereinafter, unreacted fuel), and maintains a temperature of the cell stack 151B at high temperature. That is, the ignition heater 155 ignites the unreacted fuel leaked from an opening of each cell configuring the cell stack 151B. It should be noted that the ignition heater 155 may suffice to ignite the unreacted fuel in a case where the unreacted fuel is not burnt (for example, when the fuel cell apparatus 150 is started). Then, once ignited, when the unreacted fuel gradually leaked from the cell stack 151B keeps on burning, the temperature of the cell stack 151B is kept at high temperature.

The control board 156 is a board mounted with a circuit which controls the fuel cell 151, the PCS 152, the blower 153, the desulfurizer 154, and the ignition heater 155.

In the first embodiment, the cell stack 151B is an example of a power generation unit which generates power by a chemical reaction. The reformer 151A, the blower 153, the desulfurizer 154, the ignition heater 155, and the control board 157 are an example of auxiliaries which supports the operation of the cell stack 151B. Moreover, a part of the PCS 152 may be handled as the auxiliaries.

(Network Configuration)

Figure 4:
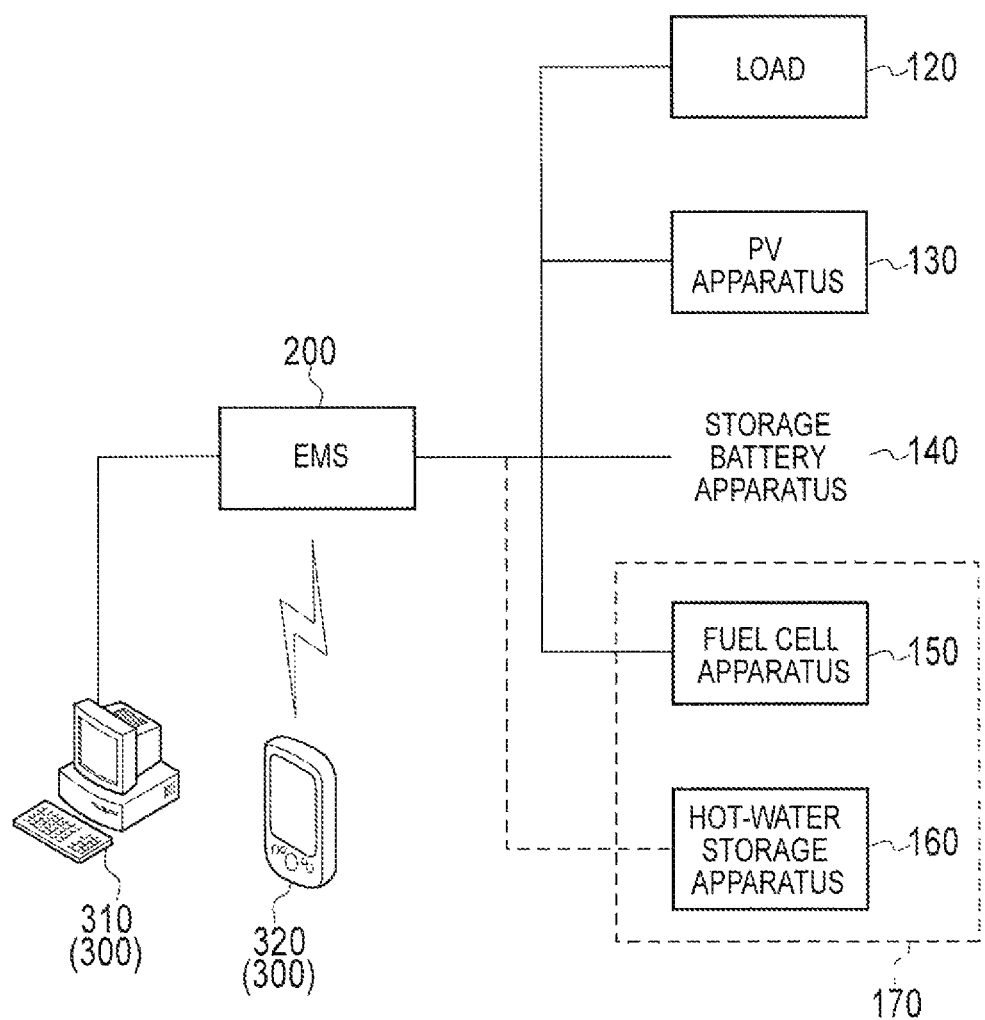
FIG. 4 is a diagram showing a network configuration according to the first embodiment.

Hereinafter, a network configuration according to the first embodiment will be described. FIG. 4 is a diagram showing a network configuration according to the first embodiment.

As shown in FIG. 4, the network is configured by the load 120, the PV apparatus 130, the storage battery apparatus 140, the fuel cell apparatus 150, the hot-water storage apparatus 160, the EMS 200, and the user terminal 300. The user terminal 300 comprises a user terminal 310 and a user terminal 320.

The user terminal 310 is connected to the EMS 200, and displays the information for visualization of energy consumption (hereinafter, the visualization information) of each equipment (the load 120, the PV apparatus 130, the storage battery apparatus 140, the fuel cell apparatus 150, and the hot-water storage apparatus 160) through a web browser. In such a case, the EMS 200 generates the visualization information in a format such as HTML, and transmits the generated visualization information to the user terminal 310. The connection type between the user terminal 310 and the EMS 200 may be wired or may be wireless.

The user terminal 320 is connected to the EMS 200, and displays the visualization information through an application. In such a case, the EMS 200 transmits the information showing the energy consumption of each equipment to the user terminal 320. The application of the user terminal 320 generates the visualization information on the basis of the information received from the EMS 200, and displays the generated visualization information. The connection type between the user terminal 320 and the EMS 200 may be wired or may be wireless.

As described above, in the first embodiment, the fuel cell apparatus 150 and the hot-water storage apparatus 160 configure the hot-water supply unit 170. Therefore, the hot-water storage apparatus 160 need not necessarily possess the function of communicating with the EMS 200. In such a case, the fuel cell apparatus 150 substitutes the hot-water storage apparatus 160 and communicates messages concerning the hot-water storage apparatus 160 with the EMS 200.

In the first embodiment, the communication between the EMS 200 and each equipment (the load 120, the PV apparatus 130, the storage battery apparatus 140, the fuel cell apparatus 150, and the hot-water storage apparatus 160) is performed by a method which is in accordance with a predetermined protocol. The predetermined protocol could be, for example, a protocol called the "ECHONET Lite" (registered trademark) and the "ECHONET" (registered trademark). However, the embodiment is not restricted to these protocols, and the predetermined protocol could also be a protocol other than the "ECHONET Lite" or the "ECHONET" (for example, ZigBee (registered trademark)).

(Configuration of EMS)

Hereinafter, an EMS according to the first embodiment will be described. FIG. 5 is a block diagram showing an EMS 200 according to the first embodiment.

As shown in FIG. 5, the EMS 200 has a reception unit 210, a transmission unit 220, and a control unit 230.

The reception unit 210 receives various types of signals from an apparatus connected via a signal line. For example, the reception unit 210 may receive information indicating the amount of power generated by the PV 131, from the PV apparatus 130. The reception unit 210 may receive information indicating the amount of power to be stored in the storage battery 141, from the storage battery apparatus 140. The reception unit 210 may receive information indicating the amount of power generated by the fuel cell 151, from the fuel cell apparatus 150. The reception unit 210 may receive information indicating the amount of hot water to be stored in the hot-water storage apparatus 160, from the hot-water storage apparatus 160. The reception unit 210 with a transmission unit 220 described below configures a communication unit.

In the first embodiment, the reception unit 210 may receive energy charge information, energy consumption prediction information, and PV power-generation amount prediction information from the various types of servers via the network 60. However, the energy charge information, the energy consumption prediction information, and the PV power-generation amount prediction information may be stored in advance in the EMS 200.

The transmission unit 220 transmits various types of signals to an apparatus connected via a signal line. For example, the transmission unit 220 transmits a signal for controlling the PV apparatus 130, the storage battery apparatus 140, the fuel cell apparatus 150, and the hot-water storage apparatus 160, to each apparatus. The transmission unit 220 transmits a control signal for controlling the load 120, to the load 120.

The control unit 230 controls the load 120, the PV apparatus 130, the storage battery apparatus 140, the fuel cell apparatus 150, and the hot-water storage apparatus 160.

(Transmitting and Receiving Messages)

In the first embodiment, a message which specifies any one of the plurality of operation modes between an EMS 200 and the storage battery apparatus 140 is defined. Here, the message which specifies any one of the plurality of operation modes preferably comprises the time when the operation in the specified operation mode is started, the time when the operation in the specified operation mode is ended, and the time period during which the operation is performed in the specified operation mode. For example, in the above-described midnight power utilization mode, it is necessary to specify the time when charging is to be started in midnight, and the time when discharging is to be started in the daytime.

The message which specifies any one of the plurality of operation modes preferably comprises the information indicating whether the specified operation mode is an operation mode in the grid connection state, or whether the specified operation mode is an operation mode in the self-sustained operation state.

For example, the storage battery apparatus 140 receives the message specifying any one of the plurality of operation modes from the EMS 200. According to the message received from the EMS 200, the storage battery apparatus 140 operates in any one of the plurality of operation modes. Alternatively, the storage battery apparatus 140 transmits the message specifying any one of the plurality of operation modes to the EMS 200. Depending on the message received from the storage battery apparatus 140, the EMS 200 acquires information regarding which of the plurality of operation modes the storage battery apparatus 140 is operating in.

Moreover, before communicating the message specifying any one of the plurality of operation modes, the storage battery apparatus 140 transmits a message indicating the existence or non-existence of a function of handling the message specifying any one of the plurality of operation modes, to the EMS 200.

In the first embodiment, the storage battery apparatus 140 transmits a message indicating the rated output of the storage battery 141, to the EMS 200. The message indicating the rated output of the storage battery 141 comprises, at least, the information indicating the rated output of the storage battery 141 in the self-sustained operation state. The message indicating the rated output of the storage battery 141 may comprise the information indicating the rated output of the storage battery 141 in the grid connection state. Here, the rated output of the storage battery 141 in the self-sustained operation state is important information for the EMS 200 so that the EMS 200 controls the other equipments (for example, the fuel cell apparatus 150 and the load 120)

Moreover, before communicating the message indicating the rated output of the storage battery 141, the storage battery apparatus 140 transmits a message indicating the existence or non-existence of a function of transmitting the rated output of the storage battery 141, to the EMS 200.

In the first embodiment, the storage battery apparatus 140 transmits a message indicating the number of charged and discharged times of the storage battery 141, to the EMS 200. The message indicating the number of charged and discharged times of the storage battery 141 comprises, at least, the number of charged and discharged times of the storage battery 141 in the current state. The message indicating the number of charged and discharged times of the storage battery 141 may comprise the maximum number of charged and discharged times of the storage battery 141. Here, the number of charged and discharged times of the storage battery 141 is important information for the EMS 200 in judging the extent of degradation of the storage battery 141.

Moreover, before communicating the message indicating the number of charged and discharged times of the storage battery 141, the storage battery apparatus 140 transmits a message indicating the existence or non-existence of a function of transmitting the message indicating the number of charged and discharged times of the storage battery 141, to the EMS 200.

In the first embodiment, the PCS 142, for example, configures the communication unit which receives the above-described message from the EMS 200, or transmits the message to the EMS 200. Alternatively, the PCS 142, for example, configures a control unit which controls the charging and discharging of the storage battery 141 according to the operation mode of the storage battery apparatus 140. However, the communication unit and the control unit may be provided in the control board arranged separate from the PCS 142.

In the first embodiment, the EMS 200 (the reception unit 210) receives a message specifying any one of a plurality of operation modes each with a different criterion of charging and discharging of the storage battery 141, from the storage battery apparatus 140 (for example, the PCS 142). As a result, the EMS 200 (the reception unit 210) acquires information regarding which of the plurality of operation modes the storage battery apparatus 140 is operating in. Alternatively, the reception unit 210 receives a message indicating the rated output of the storage battery 141 from the storage battery apparatus 140 (for example, the PCS 142). Alternatively, the EMS 200 (the reception unit 210) receives a message indicating the cumulative number of charged and discharged times of the storage battery 141 from the storage battery apparatus 140 (for example, the PCS 142). In other words, the PCS 142 of the storage battery apparatus 140 configures a communication unit which transmits the above-described messages.

In the first embodiment, before communicating the message specifying any one of the plurality of operation modes, the EMS 200 (the reception unit 210) receives a message indicating the existence or non-existence of a function of specifying any one of the plurality of operation modes, from the storage battery apparatus 140. Alternatively, before communicating the message indicating the rated output of the storage battery 141, the EMS 200 (the reception unit 210) receives a message indicating the existence or non-existence of a function of transmitting the rated output of the storage battery 141, from the storage battery apparatus 140. Alternatively, before communicating the message indicating the number of charged and discharged times of the storage battery 141, the EMS 200 (the reception unit 210) receives a message indicating the existence or non-existence of a function of transmitting the number of charged and discharged times of the storage battery 141, from the storage battery apparatus 140.

In the first embodiment, the EMS 200 (the transmission unit 220) transmits a message specifying any one of a plurality of operation modes to the storage battery apparatus 140 (for example, the PCS 142). As a result, the transmission unit 220 instructs the operation mode of the storage battery 141 to the storage battery apparatus 140. Alternatively, the EMS 200 (the transmission unit 220) transmits a message requesting the message indicating the rated output of the storage battery 141 to the storage battery apparatus 140. Alternatively, the EMS 200 (the transmission unit 220) transmits a message requesting the message indicating the number of charged and discharged times of the storage battery 141 to the storage battery apparatus 140.

In the first embodiment, before communicating the message specifying any one of the plurality of operation modes, the EMS 200 (the transmission unit 220) transmits a message requesting the message indicating the existence or non-existence of a function of specifying any one of the plurality of operation modes, to the storage battery apparatus 140. Alternatively, before communicating the message indicating the rated output of the storage battery 141, the EMS 200 (the transmission unit 220) transmits a message requesting the message indicating the existence or non-existence of a function of transmitting the rated output of the storage battery 141, to the storage battery apparatus 140. Alternatively, before communicating the message indicating the number of charged and discharged times of the storage battery 141, the EMS 200 (the transmission unit 220) transmits a message requesting the message indicating the existence or non-existence of a function of transmitting the number of charged and discharged times of the storage battery 141, to the storage battery apparatus 140.

(Message Format)

Hereinafter, the message format according to the first embodiment will be described. FIG. 6 through FIG. 8 are diagrams showing an example of a message format according to the first embodiment.

Firstly, the message specifying any one of the plurality of operation modes each with a different criterion of charging and discharging of the storage battery 141 has, for example, a format shown in FIG. 6. As shown in FIG. 6, the message comprises a field of the message type and a field of the operation mode.

The field of the message type indicates the type of the message, and in the first embodiment, it indicates that the message comprises an operation mode.

The field of the operation mode indicates the operation mode of the storage battery apparatus 140. As described above, the operation mode comprises the (a) solar light power sales priority mode, (b) the solar light charging mode, (c) the peak cut mode, (d) the midnight power utilization mode, (e) the forced power storage mode, and (f) the forced discharge mode, (g) the self-sustained power storage mode, (h) the self-sustained supply mode, and (i) the self-sustained power storage and supply mode.

Secondly, the message indicating the rated output of the storage battery 141 has, for example, a format shown in FIG. 7. As shown in FIG. 7, the message comprises a field of the message type and a field of the rated output.

The field of the message type indicates the type of the message, and in the first embodiment, it indicates that the message comprises a rated output.

The field of the rated output indicates the rated output of the storage battery 141. The field of the rated output comprises, at least, the information indicating the rated output of the storage battery 141 in the self-sustained operation state. The field of the rated output may comprise the information indicating the rated output of the storage battery 141 in the grid connection state.

Thirdly, the message indicating the number of charged and discharged times of the storage battery 141 has, for example, a format shown in FIG. 8. As shown in FIG. 8, the message comprises a field of the message type and a field of the number of charged and discharged times.

The field of the message type indicates the type of the message, and in the first embodiment, it indicates that the message comprises the number of charged and discharged times.

The field of the rated output indicates the number of charged and discharged times of the storage battery 141. The field of the number of charged and discharged times comprises, at least, the number of charged and discharged times of the storage battery 141 in the current state. The field of the number of charged and discharged times may comprise the maximum number of charged and discharged times the storage battery 141.

(Management Method)

Figure 9:
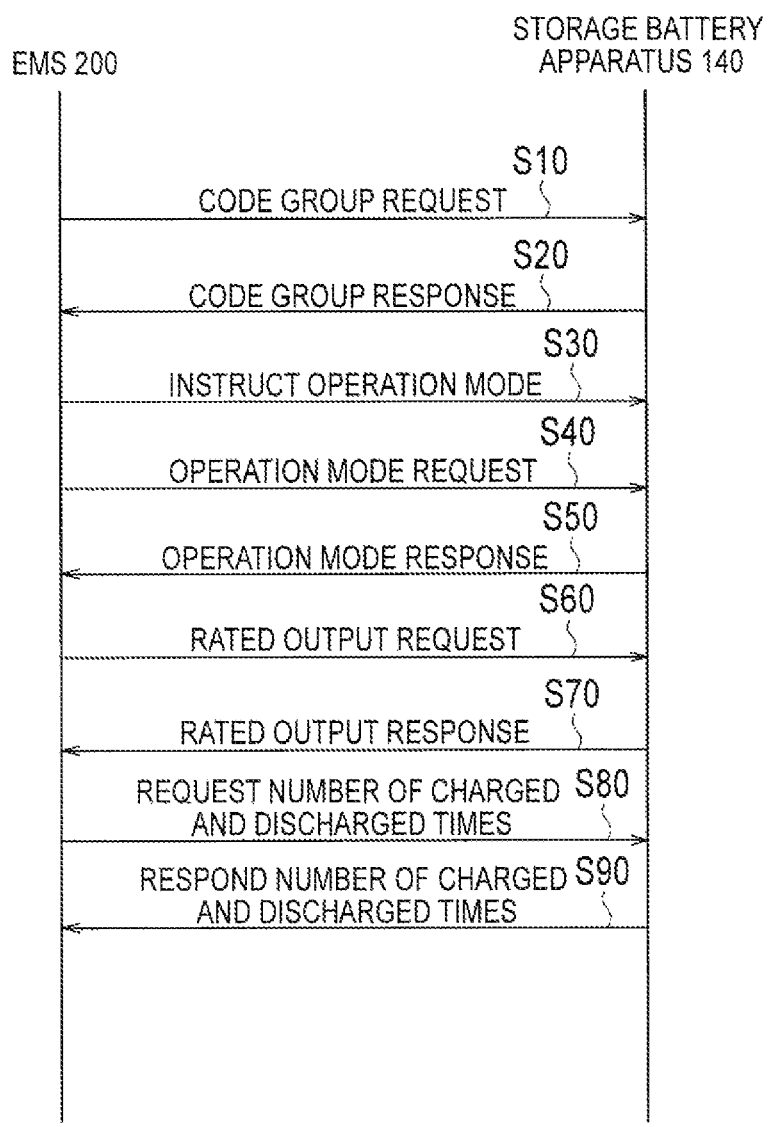
FIG. 9 is a sequence diagram showing a management method according to the first embodiment.

Hereinafter, the management method according to the first embodiment will be described. FIG. 9 is a sequence diagram showing a management method of the first embodiment.

As shown in FIG. 9, in step S10, the EMS 200 transmits a message (a code group request) requesting a code group supported by the storage battery apparatus 140, to the storage battery apparatus 140. The code group request is an example of a message requesting a message indicating the existence or non-existence of a function of specifying any one of a plurality of operation modes each with a different criterion of charging and discharging of the storage battery 141. Alternatively, the code group request is an example of a message requesting a message indicating the existence or non-existence of a function of transmitting the message indicating the rated output of the storage battery 141. Alternatively, the code group request is an example of a message requesting a message indicating the existence or non-existence of a function of transmitting the message indicating the number of charged and discharged times of the storage battery 141.

In step S20, the storage battery apparatus 140 transmits a message (a code group response) indicating the code group supported by the storage battery apparatus 140, to the EMS 200. The code group response is an example of a message indicating the existence or non-existence of a function of specifying any one of a plurality of operation modes each with a different criterion of charging and discharging of the storage battery 141. Alternatively, the code group response is an example of a message indicating the existence or non-existence of a function of transmitting the message indicating the rated output of the storage battery 141. Alternatively, the code request is an example of a message indicating the existence or non-existence of a function of transmitting the message indicating the number of charged and discharged times (cumulative number of charged and discharged times) of the storage battery 141.

In step S30, the EMS 200 transmits a message specifying any one of a plurality of operation modes each with a different criterion of charging and discharging of the storage battery 141, to the storage battery apparatus 140. Upon receiving the message, the storage battery apparatus 140 determines the specified mode from the message, and switches the state of the storage battery apparatus 140 to the specified mode. As a result, the EMS 200 instructs the operation mode of the storage battery apparatus 140 to the storage battery apparatus 140. Moreover, the storage battery apparatus 140 may respond to the EMS 200 about the reception of the instruction for switching the mode, or completion of switching of the mode.

After some time has elapsed, in step S40, the EMS 200 transmits a message (an operation mode request) requesting the notification of the operation mode of the storage battery apparatus 140, to the storage battery apparatus 140.

In step S50, the storage battery apparatus 140 transmits, as a response to the request, a message (an operation mode response) indicating the operation mode of the storage battery 141, to the EMS 200.

In step S60, the EMS 200 transmits a message (a rated output request) requesting the notification of the rated output of the storage battery 141, to the storage battery apparatus 140.

In step S70, the storage battery apparatus 140 transmits a message (a rated output response) indicating the rated output of the storage battery 141, to the EMS 200. Here, the response of the rated output may comprise both the rated output and the output during self-sustained operation, or may be configured to comprise information about the output in accordance with whether the current state is the grid connection state or the self-sustained operation state.

In step S80, the EMS 200 transmits a message (number of charged and discharged times request) requesting the notification of the number of charged and discharged times of the storage battery 141, to the storage battery apparatus 140.

In step S90, the storage battery apparatus 140 transmits a message (number of charged and discharged times response) indicating the cumulative frequency of charging and discharging of the storage battery 141, to the EMS 200.

As explained earlier, in the first embodiment, a message which entrusts a charging and discharging control of the storage battery 141 performed in accordance with the operation mode of the storage battery apparatus 140 to the storage battery apparatus 140, and at the same time, specifies any one of a plurality of operation modes each with a different criterion of charging and discharging of the storage battery 141 is defined. Thus, the EMS 200 can appropriately control the storage battery apparatus 140 without being affected by the communication delay between the EMS 200 and the storage battery apparatus 140. Moreover, the EMS 200 can identify the amount of charging and discharging of the storage battery apparatus 140, for example, and can thus appropriately control the other equipments (such as a load and a fuel cell apparatus).

In the first embodiment, by receiving the message indicating the rated output of the storage battery 141 in the self-sustained operation state from the storage battery apparatus 140, the EMS 200 can appropriately control the other equipments (such as a load and fuel cell apparatus) in the self-sustained operation state. Alternatively, by receiving the message indicating the number of charged and discharged times of the storage battery 141 from the storage battery apparatus 140, the EMS 200 can judge the extent of degradation of the storage battery 141. Specifically, in the case of a battery in which the number of cycles of charging and discharging has a relatively strong relationship with the extent of degradation, like a lithium ion battery, the extent of degradation of the storage battery 141 can be determined to a certain level by calculation.

Other Embodiments

Although the present invention has been described with reference to the embodiment described above, it should not be understood that the discussion and drawings constituting a part of the disclosure are limiting the present invention. Various alternative embodiments, examples and operation technology will be apparent to a person skilled in the art from the present disclosure.

The EMS 200 may be HEMS (Home Energy Management System), may be SEMS (Store Energy Management System), may be BEMS (Building Energy Management System), and may be FEMS (Factory Energy Management System).

In the embodiment, the consumer's facility 10 comprises the load 120, the PV apparatus 130, the storage battery apparatus 140, the fuel cell apparatus 150, and the hot-water storage apparatus 160. However, it may suffice that the consumer's facility 10 comprises at least the storage battery apparatus 140.

In the embodiment, the (a) solar light power sales priority mode, the (b) solar light charging mode, and the (c) peak cut mode were illustrated as the operation mode in which another equipment other than the storage battery 141, and the storage battery 141 are cooperated. However, the embodiment is not limited thereto. For example, the operation mode of the storage battery apparatus 140 may comprise an operation mode in which the storage battery 141 is cooperated to the load 120, the fuel cell apparatus 150, or the hot-water storage apparatus 160.

Specifically, it is preferable to perform transmission and reception of the code group request and the code group response at the timing of performing the initial settings of the storage battery apparatus 140, the timing of restoration from a power failure, the timing of turning ON the power supply of the storage battery apparatus 140, the timing of turning ON the power supply of the EMS 200, and the timing when it becomes necessary to check the settings of the storage battery apparatus 140

Although not particularly mentioned in the embodiment, a message indicating the status of the storage battery 141 is preferably defined between the EMS 200 and the storage battery apparatus 140. The message indicating the operation mode of the storage battery apparatus 140 and the message indicating the number of charged and discharged times of the storage battery 141 are an example of the message indicating the status of the storage battery 141.

Although not particularly mentioned in the embodiment, a message indicating the spec of the storage battery 141 is preferably defined between the EMS 200 and the storage battery apparatus 140. The message indicating the rated output of the storage battery 141 is an example of the message indicating the spec of the storage battery 141.

Although not particularly mentioned in the embodiment, the storage battery apparatus 140 may autonomously transmit various types of messages to the EMS 200 rather than upon a request from the EMS 200. For example, the storage battery apparatus 140 transmits various types of messages to the EMS 200 when the predetermined conditions are fulfilled.

Although not particularly mentioned in the embodiment, the storage battery apparatus 140 may transmit a message indicating the spec of the storage battery 141 (for example, a message indicating the rated output of the storage battery 141), as well as a message indicating the status of the storage battery 141, along with a code group response, to the EMS 200.

As described above, needless to say, the present invention comprises various embodiments and the like not described here. Moreover, it is also possible to combine the above-described embodiments and modifications. Therefore, the technical range of the present invention is to be defined only by the inventive specific matter according to the adequate claims from the above description.

It is noted that the entire content of Japan Patent Application No. 2012-174458 (filed on Aug. 6, 2012) is incorporated in the present application by reference.

INDUSTRIAL APPLICABILITY

According to the present invention, it is possible to provide a management method, a control apparatus, and a power storage apparatus capable of appropriately controlling equipments.

The invention claimed is:

1. A management method used in a management system comprising a power storage apparatus configured to accumulate power, and a control apparatus configured to communicate with the power storage apparatus, the management method comprising:

transmitting, from the power storage apparatus to the control apparatus via a network of a consumer's facility, at least one first message indicating an existence or non-existence of a function of notifying a rated output of the power storage apparatus, transmitting, from the control apparatus to the power storage apparatus via the network, at least one second message requesting notification of the rated output of the power storage apparatus, based on the at least one first message received from the power storage apparatus, transmitting, from the power storage apparatus to the control apparatus via the network, a third message comprising a first rated output of the power storage apparatus in a grid connection state in which the power storage apparatus is connected to a grid, based on the at least one second message, transmitting, from the power storage apparatus to the control apparatus via the network, a fourth message comprising a second rated output of the power storage apparatus in a self-sustained state in which the power storage apparatus is disconnected from the grid, based on the at least one second message, controlling, by the control apparatus via the network, a charge and/or discharge of the power storage apparatus based on the first rated output in the grid connection state indicated by the third message, and controlling, by the control apparatus via the network, a charge and/or discharge of the power storage apparatus based on the second rated output in the self-sustained state indicated by the fourth message.

2. The management method according to claim 1, wherein said at least one first message indicating the existence or non-existence of the function is transmitted at a timing of performing an initial settings of the power storage apparatus, a timing of restoration from a power failure, a timing of turning ON a power supply of the power storage apparatus, a timing of turning ON a power supply of the control apparatus, and a timing when it becomes necessary to check settings of the power storage apparatus.

3. A control apparatus configured to communicate with a power storage apparatus configured to accumulate power, comprising:

a communication unit configured to receive from the power storage apparatus via a network of a consumer's facility, at least one first message indicating an existence of non-existence of a function of notifying a rated output of the power storage apparatus, transmit to the power storage apparatus via the network, at least one second message requesting notification of the rated output of the power storage apparatus, based on the at least one first message received from the power storage apparatus, receive from the power storage apparatus via the network, a third message comprising a first information element indicating a first rated output of the power storage apparatus in a grid connection state in which the power storage apparatus is connected to a grid, based on the at least one second message, and receive, from the power storage apparatus via the network, a fourth message comprising second rated output of the power storage apparatus in a self-sustained state in which the power storage apparatus is disconnected from the grid, based on the at least one second message; and a controller that controls, via the network, a charge and/or discharge of the power storage apparatus based on the first rated output in the grid connection state indicated by the third message, and controls, via the network, a charge and/or discharge of the power storage apparatus based on the second rated output in the self-sustained state indicated by the fourth message.

4. The control apparatus according to claim 3, wherein said at least one first message indicating the existence or non-existence of the function is received at a timing of performing an initial settings of the power storage apparatus, a timing of restoration from a power failure, a timing of turning ON a power supply of the power storage apparatus, a timing of turning ON a power supply of the control apparatus, and a timing when it becomes necessary to check settings of the power storage apparatus.

5. A power storage apparatus configured to accumulate power, comprising:

a communication unit configured to transmit, to a control apparatus configured to communicate with the power storage apparatus via a network of a consumer's facility, at least one first message indicating an existence or non-existence of a function of notifying a rated output of the power storage apparatus, receive, from the control apparatus via the network, at least one second message requesting notification of the rated output of the power storage apparatus, based on the at least one first message received from the power storage apparatus, transmit, to the control apparatus via the network, a third message comprising a first rated output of the power storage apparatus in a grid connection state in which the power storage apparatus is connected to a grid, based on the at least one second message, and transmit, to the control apparatus via the network, a fourth message comprising a second rated output of the power storage apparatus in a self-sustained state in which the power storage apparatus is disconnected from the grid, based on the at least one second message;

wherein the power storage apparatus charges or discharges according to a control by the control apparatus via the network that is based on the first rated output in the grid connection state indicated by the third message and that is based on the second rated output in the self-sustained state indicated by the fourth messages.

6. The power storage apparatus according to claim 5, wherein said at least one first message indicating the existence or non-existence of the function is transmitted at a timing of performing an initial settings of the power storage apparatus, a timing of restoration from a power failure, a timing of turning ON a power supply of the power storage apparatus, a timing of turning ON a power supply of the control apparatus, and a timing when it becomes necessary to check settings of the power storage apparatus.

* * * * *